United States Patent
Ijaz et al.

(10) Patent No.: US 12,265,887 B2
(45) Date of Patent: Apr. 1, 2025

(54) APPARATUS AND METHODS FOR QUANTUM COMPUTING WITH PRE-TRAINING

(71) Applicant: Xanadu Quantum Technologies Inc., Toronto (CA)

(72) Inventors: Aroosa Ijaz, Toronto (CA); Maria Schuld, Durban (ZA); Seth Lloyd, Cambridge, MA (US)

(73) Assignee: Xanadu Quantum Technologies Inc., Toronto (CA)

( * ) Notice: Subject to any disclaimer, the term of this patent is extended or adjusted under 35 U.S.C. 154(b) by 798 days.

(21) Appl. No.: 17/118,004

(22) Filed: Dec. 10, 2020

(65) Prior Publication Data

US 2021/0192381 A1     Jun. 24, 2021

Related U.S. Application Data

(60) Provisional application No. 62/949,768, filed on Dec. 18, 2019.

(51) Int. Cl.
*G06N 10/60*     (2022.01)
*G06N 3/045*     (2023.01)
*G06N 3/08*      (2023.01)
*G06N 20/20*     (2019.01)

(52) U.S. Cl.
CPC ............. *G06N 10/60* (2022.01); *G06N 3/045* (2023.01); *G06N 3/08* (2013.01); *G06N 20/20* (2019.01)

(58) Field of Classification Search
CPC ........ G06N 10/00; G06N 20/20; G06N 3/045; G06N 3/08
See application file for complete search history.

(56) References Cited

PUBLICATIONS

Dallaire-Demers et al., Quantum Generative Adversarial Networks, Apr. 2018. (Year: 2018).*
Schuld et al., Quantum Machine Learning in Feature Hilbert Spaces, Physical Review Letters 112, 040504, Feb. 2019. (Year: 2019).*
Schuld et al., Quantum Machine Learning in Feature Hilbert Spaces, Mar. 2018. (Year: 2018).*
Lloyd et al., Quantum Generative Adversarial Learning, Apr. 2018. (Year: 2018).*
Shrivastava et al., OpticalGAN: Generative Adversarial Networks for Continuous Variable Quantum Computing, Sep. 2019. (Year: 2019).*
Killoran et al., "Continuous-variable quantum neural networks," arXiv:1806.06871v1 [quant-ph], Jun. 18, 2018, 21 pages.

* cited by examiner

*Primary Examiner* — Marshall L Werner
(74) *Attorney, Agent, or Firm* — Cooley LLP

(57) ABSTRACT

A method includes training a first QNN by sending a first dataset into the first QNN to generate a first output and configuring the first QNN into a first setting based on the training. The method also includes receiving a second dataset, using at least a portion of the first QNN to generate a second output using the first setting, and sending the second output to a second QNN, operatively coupled to the first QNN, to train the second QNN. The second QNN is configured in a fixed setting during training of the first QNN.

17 Claims, 12 Drawing Sheets

APPARATUS AND METHODS FOR QUANTUM COMPUTING WITH PRE-TRAINING

CROSS-REFERENCE TO RELATED APPLICATIONS

This application claims priority to and benefit of U.S. Provisional Patent Application No. 62/949,768, filed Dec. 18, 2019 and titled "Apparatus and Methods for Quantum Computing With Pre-Training," the entire content of which is incorporated herein by reference in its entirety.

FIELD

One or more embodiments relate to machine learning based on quantum computing with pre-training.

BACKGROUND

Quantum computing can be a useful tool for machine learning (e.g., via a quantum neural network, or QNN). Known approaches to operate QNNs usually include preparing one or more quantum states representing input data in Hilbert space (also referred to as embedding) and then training the entire QNN (including the embedding process) such that the QNN produces an expected result. For example, in image classification, the input data can represent images of two different types (e.g., bees and ants). In the QNN after training, measuring a designated qubit in quantum state $|1\rangle$ can indicate that the input image is of the first type (e.g., bees) and measuring a designated qubit in quantum state $|0\rangle$ indicates that the input image is of the second type (e.g., ants). The training of QNNs in these known approaches, however, may take a long time because each optimization step can involve many measurements (i.e., performing a large number of quantum experiments). Therefore, although a trained QNN may solve a particular problem (e.g., image classification) faster than a classical computer, the long training time may erode or even eliminate such quantum advantage.

SUMMARY

Some embodiments described herein relate generally to quantum computing with pre-training, and, in particular, to quantum neural networks (QNNs) including one or more pre-trained layers. In some embodiments, a method includes training a first QNN by sending a first dataset into the first QNN to generate a first output and configuring the first QNN into a first setting based on the training. The method also includes receiving a second dataset and using at least a portion of the first QNN to generate a second output based on the second dataset and using the first setting. The second output is sent to a second QNN, operatively coupled to the first QNN, to train the second QNN. The second QNN is configured in a fixed setting during the training of the first QNN.

In some embodiments, a non-transitory, processor-readable medium is configured to store code representing instructions to be executed by a processor. The code comprises code to cause the processor to receive a first dataset, and to use at least a portion of a first QNN to generate a first output using a first setting. The first setting is determined based on training the first QNN using a second dataset. The code also comprises code to cause the processor to send the first output to a second QNN, operatively coupled to the first QNN, to train the second QNN. The second QNN is configured in a first fixed setting during training of the first QNN.

In some embodiments, an apparatus includes a first quantum neural network (QNN) configured in a fixed setting based on training. The first QNN is configured to receive a first dataset and generate a first output using the fixed setting. The apparatus also includes a second QNN operatively coupled to the first QNN and being differentiable. The second QNN is configured to receive the first output and generate a second output.

BRIEF DESCRIPTION OF THE DRAWINGS

The drawings primarily are for illustration purposes and are not intended to limit the scope of the subject matter described herein. The drawings are not necessarily to scale; in some instances, various aspects of the disclosed subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1:
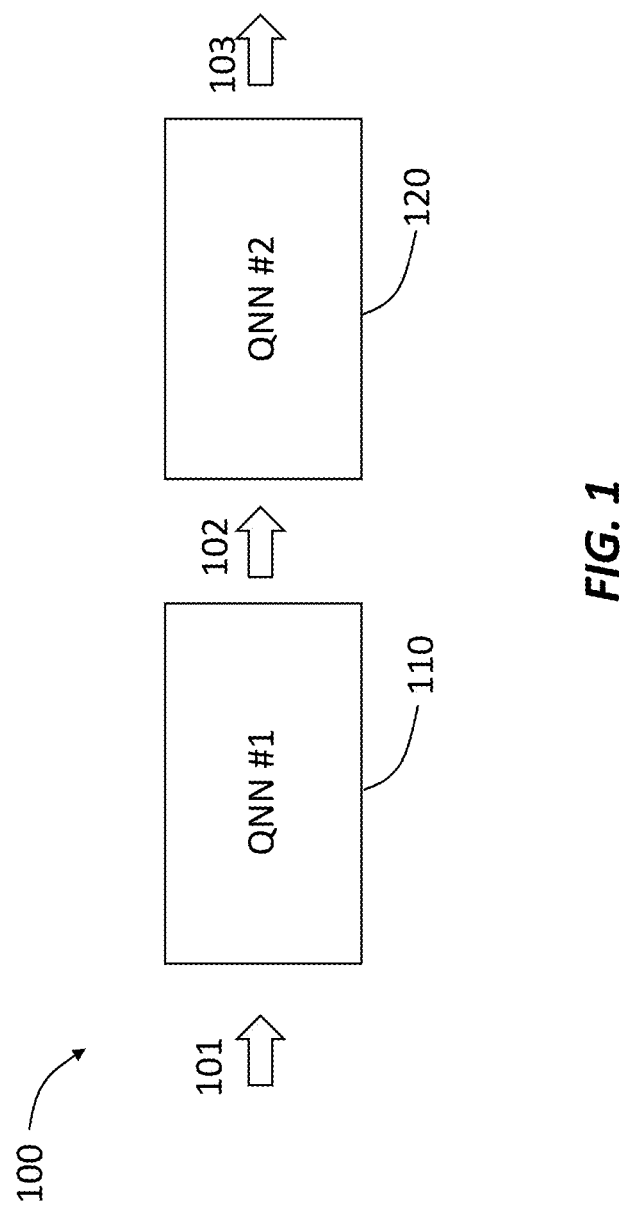
FIG. 1 shows a schematic of an apparatus for quantum computing with pre-training, according to an embodiment.

To address the challenges in known approaches for quantum neural networks (QNNs), apparatus and methods described herein use pre-training to reduce the training time. FIG. 1 shows a schematic of an apparatus 100 for quantum computing with pre-training, according to an embodiment. The apparatus 100 includes a first QNN 110 configured in a fixed setting based on training (also referred to herein as "pre-training"). The first QNN 110 is configured to receive a first dataset 101 and generate a first output 102 using the fixed setting (also referred to as a non-variational setting). In some embodiments, the pre-training of the first QNN 110 uses a dataset different from the first dataset 101. The apparatus 100 also includes a second QNN 120, which is operatively coupled to the first QNN 110 and is differentiable (also referred to as trainable or variational). The second QNN 120 is configured to receive the first output 102 as its input and generate a second output 103.

In some embodiments, the pre-training of the first QNN 110 can be performed by the manufacturer (or a third party service provider) of the apparatus 100. The user of the apparatus 100 can then limit the training of the apparatus 100 to the second QNN 120 (which may be at a user's location and not at the factory with the first QNN). In other words, operation of the apparatus 100 can take advantage of the knowledge acquired during the pre-training. In contrast, known approaches usually train a QNN as a whole (also referred to as end-to-end training) and each optimization step can possibly change the setting of any quantum gate in the QNN, i.e., without using any prior knowledge or advantage.

In some embodiments, the pre-training of the first QNN 110 can be performed by the manufacturer of the apparatus 100, and the resulting setting (i.e., the fixed setting) can be reproduced in multiple copies of apparatus similar to the apparatus 100 without additional training. In these embodiments, each user of one copy of the apparatus 100 may still train the second QNN 120 to properly configure the entire apparatus 100 (e.g., for the user-specific problem to be solved). But the average time for training one copy of the apparatus 100 is still less than the end-to-end training time for a QNN having a similar dimension (i.e., number of quantum gates).

In some embodiments, the fixed setting of the first QNN 110 can be hard-wired into the first QNN 110 such that users are not allowed to change the fixed setting of the first QNN 110. In some embodiments, the fixed setting of the first QNN 110 is temporary and a user can still change the setting of the first QNN 110 if desired. For example, the fixed setting of the first QNN 110 can be maintained when the second QNN 120 is being trained and/or when the apparatus 100 is used to solve a given problem, but changed later for a different use or analysis.

In some embodiments, the pre-training of the first QNN 110 is configured to determine the fixed setting for the first QNN 110 to perform quantum embedding. In these embodiments, the first QNN 110, in the fixed setting, is configured to embed classical data (e.g., dataset 101) into a plurality of quantum states (e.g., output 102). More details about quantum embedding are provided below with reference to, e.g., FIGS. 3-8B.

The apparatus 100 can be implemented on various platforms. In some embodiments, the apparatus 100 can be implemented on a photonic platform (e.g., the QNNs 110 and 120 include photonic circuits). In some embodiments, the apparatus 100 can be implemented on or using other appropriate platforms, such as superconducting systems, ion traps, quantum dots, and atom-optical systems, among others. In some embodiments, the apparatus 100 can be implemented as a virtual machine (e.g., software). More information about implementing QNNs can be found in, for example, Nathan Killoran, Thomas R Bromley, Juan Miguel Arrazola, Maria Schuld, Nicolas Quesada, and Seth Lloyd, "Continuous-variable quantum neural networks," arXiv preprint arXiv: 1806.06871, 2018; Nathan Killoran, et al., "Continuous-variable quantum neural networks," *Phys. Rev. Research,* 1, 033063, 2019; and in U.S. patent application Ser. No. 16/444,624, titled "APPARATUS AND METHODS FOR QUANTUM COMPUTING AND MACHINE LEARNING" and filed Jun. 18, 2019, the contents of each of which are incorporated by reference herein in their entireties.

In some embodiments, a user can operate the apparatus 100 as follows. The operation includes receiving a first dataset and using at least a portion of the first QNN 110 to generate a first output 102 using a first setting. The first setting can be determined based on training the first QNN 110 using a second dataset (not shown in FIG. 1). The first output 102 is then sent into the second QNN 120 to train the second QNN 120. In some embodiments, the second QNN 120 is configured in a fixed setting during training of the first QNN 110. In some embodiments, the first QNN 110 can be trained without the presence of the second QNN 120 (e.g., performed in a factory).

In some embodiments, the operation of the apparatus 100 can be performed by a processor (also referred to as a controller, not shown in FIG. 1). The processor can include any suitable processing device configured to run or execute a set of instructions or code (e.g., stored in the memory) such as a general-purpose processor (GPP), a field programmable gate array (FPGA), a central processing unit (CPU), an accelerated processing unit (APU), a graphics processor unit (GPU), an Application Specific Integrated Circuit (ASIC), and/or the like. Such a processor can run or execute a set of instructions or code stored in the memory associated with using a PC application, a mobile application, an internet web browser, a cellular and/or wireless communication (via a network), and/or the like.

Figure 2:
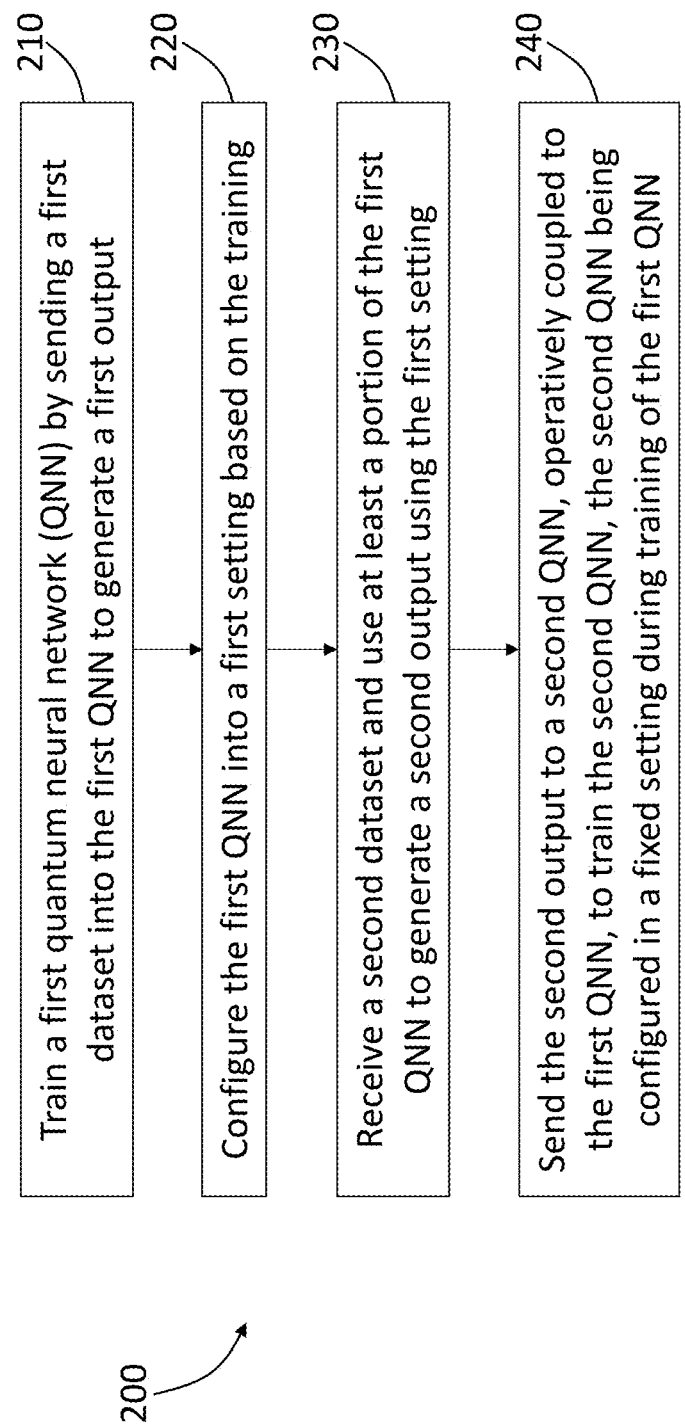
FIG. 2 is a flowchart illustrating a method of quantum computing with pre-training, according to an embodiment.

FIG. 2 is a flowchart illustrating a method 200 of quantum computing with pre-training, according to an embodiment. The method 200 includes, at 210, training a first quantum neural network (QNN) by sending a first dataset into the first QNN to generate a first output, followed by configuring the first QNN into a first setting based on the training at 220. The training of the first QNN at 210 is also referred to as pre-training herein. The method 200 also includes, at 230, receiving a second dataset, and using at least a portion of the first QNN to generate a second output with the first setting. The second output is then sent to a second QNN, operatively coupled to the first QNN, to train the second QNN at 240. In some embodiments, the second QNN is configured in a fixed setting during the training of the first QNN.

In some embodiments, the pre-training of the first QNN can be performed before the second QNN is operatively coupled to the first QNN. For example, the first QNN can be pre-trained without the presence of the second QNN or without the second QNN being coupled to the first QNN. In some embodiments, the pre-training of the first QNN can be performed using the second QNN as a measurement circuit, and the measurement result can be used as a feedback to adjust the setting of the first QNN.

In some embodiments, the pre-training of the first QNN can be configured to determine the fixed setting for the first QNN to perform quantum embedding. In this instance, the first dataset includes classical data, and the first output includes a plurality of quantum states. In some embodiments, the second QNN can be configured to measure the fidelity of the first output and the training of the first QNN can be based on the measured fidelity. In some embodiments, the second QNN can be configured to perform a Helstrom measurement of the first output, and the pre-training of the first QNN is based on the result of the Helstrom measurement.

As described herein, the pre-training approach for quantum computing can be used to perform quantum embedding. For example, in the apparatus 100, the first QNN 110 can be trained to optimize quantum embedding, and the second QNN 120 is configured to use the quantum states generated by the optimized embedding as input for further processing (e.g., classification or discrimination). This approach is in direct contrast with known approaches in quantum machine learning: instead of optimizing (or learning) the discrimination procedure, the pre-training approach here is configured to train the state preparation procedure to map classical data into tight, well-separated clusters in Hilbert space. To facilitate the optimization of quantum embedding, two types of measurements to discriminate between embedded clusters can be used: fidelity measurement and Helstrom measurement. The fidelity measurement or the Helstrom measurement can be used to compare with a given criterion (e.g., a figure of merit or cost) so as to adjust the setting of the first QNN 110 and realize optimization.

The pre-training approach has several advantages. First, training only the quantum embedding rephrases the open question of "how well a quantum circuit can recognize patterns" to "how well can we embed data into quantum computers," thereby providing a clear mathematical (and more quantitative) definition to characterize the performance of a quantum computer. Second, the training of the embedding procedure is separate from the classification procedure, so the variational parameters (e.g., optimized settings of the first QNN 110) can be stored (e.g., in a classical computer) and then readily used in conjunction with different classification strategies. This can decrease the coherence time of a quantum classifier even further.

Without being bound by any particular theory or mode of operation, quantum embedding represents (or expresses) classical data as quantum states in a Hilbert space via a "quantum feature map". For example, an embedding process can translate the classical data point x into a set of gate parameters in a quantum circuit, thereby causing the QNN to produce a quantum state $|\varphi(x)\rangle$.

Figure 3:
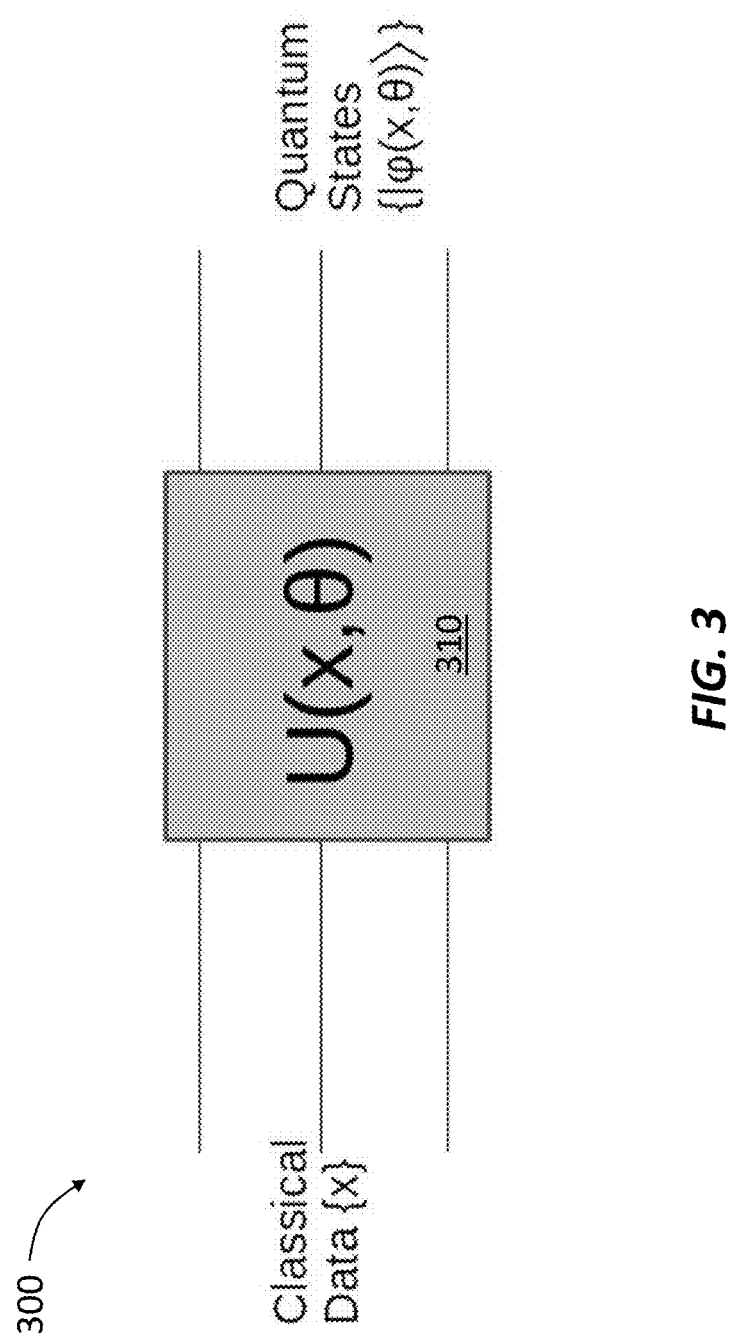
FIG. 3 shows a schematic of an apparatus for quantum embedding, according to an embodiment.

FIG. 3 shows a schematic of an apparatus 300 for quantum embedding, according to an embodiment. The apparatus 300 includes a quantum circuit 310 (labelled as U(x, θ) in FIG. 3) that has a set of quantum gates. The set of quantum gates is configured to function as a quantum feature map on a classical dataset $\{x\}$, i.e., translating the classical dataset into quantum states $\{|\varphi(x, \theta)\rangle\}$. The parameter θ is associated with the setting of the quantum circuit 310 and is usually adjustable.

Figure 4:
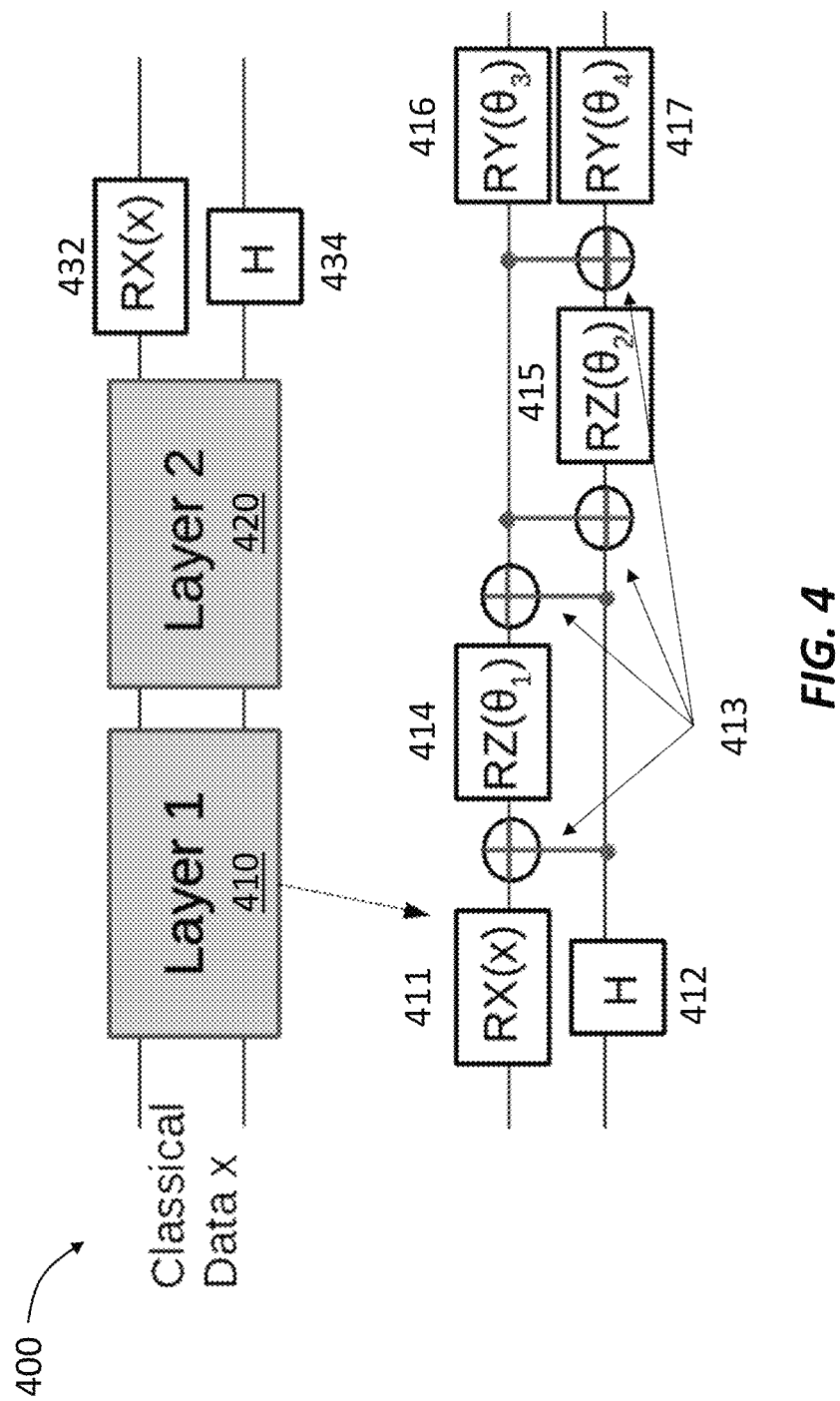
FIG. 4 shows a schematic of an apparatus for quantum embedding based on quantum algorithm optimization approach (QAOA), according to an embodiment.

FIG. 4 shows a schematic of an apparatus 400 for quantum embedding based on the quantum approximate optimization algorithm (QAOA), according to an embodiment. The apparatus 400 can be configured to embed a single classical data point x into a 2-qubit quantum state. The apparatus includes a first layer 410 and a second layer 420, each of which includes a set of quantum gates. For example, the first layer 410 includes a rotation gate 411 (labelled as RX(x)) configured to perform a rotation of input data about the x-axis and the rotation angle is given by the classical data x and a Hadamard gate 412. The first layer further includes two rotation gates 414 and 415 (labelled as $RZ(\theta_1)$ and $RZ(\theta_2)$ in FIG. 4) configured to perform rotations about the z axis, and two rotation gates 416 and 417 (labelled $RY(\theta_3)$ and $RY(\theta_4)$ in FIG. 4) configured to perform rotations about the y axis. The rotation gates and the Hadamard gate are operatively coupled together by a plurality of controlled NOT gates 413. The second layer 420 can include a similar set of quantum gates. In addition, the output of the second layer 420 is sent to a rotation gate 432 and a Hadamard gate 434.

In FIG. 4, only two layers 410 and 420 are shown for illustrative purposes only. In some embodiments, the apparatus 400 can include any other number of layers. The number of layers in the apparatus 400 is a hyper-parameter, which can be optimized during the training of the apparatus 400. In addition, the parameters $\theta_1$ to $\theta_4$ are also adjustable (i.e., the rotation gates are parameterized gates). These parameters can also be trained to realize optimal quantum embedding using the apparatus 400.

The apparatus 300 and 400 can be used as the first QNN 110 in the apparatus 100 and configured to implement kernel methods for machine learning, which operate by embedding data points x as vectors $\vec{x} \in H$, where H is a Hilbert space, i.e., a vector space with inner product and metric. The embedded data is then analyzed by performing linear algebra on the vectors $\vec{x}$.

Without being bound by any particular theory or mode of operation, operation of the kernel methods can be understood as follows. Suppose that the classical data can be divided into two types (e.g., images of ants and bees) and possesses an underlying metric Δ. In addition, the distance between data points within the same type (e.g., distance between ant images Δ(a, a') or distance between bee images Δ(b, b')) is on average significantly smaller than the distance between data points of different types (i.e., distance between ant and bee images Δ(a, b)). In some instances, it can be challenging to define the metric Δ, which can be in a highly complex nonlinear form that is computationally difficult to evaluate.

Basic theorems of metric spaces imply that a finite metric space can be embedded in a high-dimensional Hilbert space, in such a way that the metric between the embedded data vectors in Hilbert space $d(\vec{x}_1, \vec{x}_2)$ approximates the underlying metric $\Delta(x_1, x_2)$. The dimension of the Hilbert space can be large (e.g., on the order of the number of data points) so as to achieve a faithful embedding. Once a faithful embedding is achieved, then computations to compare data vectors and assign the data vectors to clusters (i.e., classification or discrimination) can be performed using linear algebraic techniques.

The Hilbert space of quantum mechanics is the vector space $C^N$, where $N=2^n$ for the state of n qubits, and the states ψ are written in Dirac notation as $|\psi\rangle$, with inner product defined as $\psi_1^\dagger \psi_2 = \langle \psi_1 | \psi_2 \rangle$ and metric $d^2(\psi_1 | \psi_2) = |\psi_1 \psi_2|^2$. Due to the probabilistic interpretation of quantum mechanics, state vectors are usually normalized to 1. A measurement to verify that a vector is $|\psi\rangle$ corresponds to a projection measurement, i.e., $P_\psi = |\psi\rangle\langle\psi|$, which yields the answer Yes (i.e., verified) with probability $\langle \psi | P_\psi | \psi \rangle = |\langle \psi | \psi \rangle|^2 = 1$. When applied to another vector, e.g., $|\psi_2\rangle$, the measurement yields the answer Yes with probability $\langle \psi_2 | P_\psi | \psi \rangle = |\langle \psi_2 | \psi \rangle|^2$.

A quantum embedding is a quantum state $|\varphi(x, \theta)\rangle$ that depends on an input data point x and the parameter(s) θ of the embedding circuit (e.g., apparatus 300 and 400). Without loss of generality, the input data point can be a K-dimensional vector of real numbers, i.e., $x \in \mathbb{R}^K$. The embedding is typically performed by associating physical parameters in the preparation of the quantum state (e.g., angles in single-qubit rotations) with the input. An embedding can be made trainable by using parametrized gates or physical parameters as free variables that can be adapted via optimization.

A figure of merit (FOM) can be defined to train a quantum embedding to separate a dataset into clusters of "well-separated" and "tight" quantum states. It can be helpful for the FOM to be easily estimated using a quantum computer and reflect natural distances in quantum Hilbert space. In some embodiments, a FOM for optimal embedding can be defined as follows.

Consider the case of two labeled sets $A=\{a_i\}$, $B=\{b_i\}$ of M inputs each (this case can be generalized to different cardinalities of data sets). The inputs are mapped into sets of quantum states $\{|a_i\rangle\}$, $\{|b_i\rangle\}$ embedded in Hilbert space.

The process of uniformly sampling inputs from A or B is described by the density matrices $\rho=(1/M)\Sigma_i|a_i\rangle\langle a_i|$, and $\sigma=(1/M)\Sigma_j|b_j\rangle\langle b_j|$, which represent ensembles of embedded inputs in Hilbert space. With the above notations, a FOM for distinguishability between the two ensembles can be defined as:

$$D=(\tfrac{1}{2})(tr\rho^2+tr\sigma^2)-tr(\rho\sigma) \qquad (1)$$

In Equation (1), $tr\rho^2$ and $tr\sigma^2$ are measures for the intercluster overlap, which is closely connected to the purity and rank of the respective density matrices. For example, when $tr\rho^2=1$, the embedding maps all inputs $\{a_i\}$ to the same state $|a\rangle$, and therefore rank $(\rho)=1$. This means that the cluster of class-A states in Hilbert space is maximally tight. For $tr\rho^2=0.5$, the density matrix has full rank and the states $|a_i\rangle$ are maximally spread in Hilbert space.

The term $tr(\rho\sigma)$ in Equation (1) measures the distance between the two ensembles in Hilbert space via the inter-cluster overlap. More specifically, D=0 indicates that the ensembles are the same, while $tr(\rho\sigma)=0$ means they are orthogonal. The FOM D has the value 0 when $\rho=\sigma$, in which case the two ensembles are indistinguishable. The FOM D has the value 1 when the ensembles are perfectly distinguishable. In addition, M=1 indicates that the clusters consist of two orthogonal states.

Complementary to the figure of merit, a cost for a given embedding can be defined as:

$$C=tr(\rho\sigma)-(\tfrac{1}{2})(tr\rho^2+tr\sigma^2) \qquad (2)$$

An embedding can be trained either by minimizing the cost or by maximizing the figure of merit. The different terms in D can be estimated on a quantum computer by performing SWAP tests either between inputs of the same class or between inputs of different classes. A SWAP test can be performed by a circuit that estimates the expectation of a single-qubit Pauli-Z observable $\langle\sigma_z\rangle=tr(e_1e_2)$ by feeding in quantum states from two ensembles $e_1$ and $e_2$. The number of SWAP tests needed to obtain an estimate of C can be $O(C^{-1})$.

Besides the intuitive motivation as a criterion for optimizing quantum embedding, the FOM (or cost) as defined in Equation (1) (or Equation (2)) has several other useful properties. First, the FOM can also optimize the runtime of Helstrom measurements. In addition, a low cost can lead to a good performance of the subsequent classification procedure (e.g., performed by the second QNN 120 in the apparatus 100). Second, the FOM is equivalent to the maximum mean discrepancy between the two distributions from which the data from the two classes was sampled. Therefore, this measure can be a powerful tool in training Generative Adversarial Networks (GANs).

The probabilistic interpretation of the Hilbert space metric in quantum mechanics supplies the optimal measurement for discriminating between two clusters of embedded data. Suppose a new data point x is a previously seen or unseen example from either class A or class B, and one would like to assign the embedded data point $|x\rangle$ either to the ensembles $\rho$ or $\sigma$ defined by the training set. It can be further assumed that many copies of $|x\rangle$, $\rho$ and $\sigma$ are accessible. The theory of quantum state discrimination implies that the minimum error measurement for assigning $|x\rangle$ to either A or B is given by projecting the multiple copies $|x\rangle\otimes\ldots\otimes|x\rangle$ onto the positive eigenvalue subspace of the operator:

$$(\rho\otimes\ldots\otimes\rho)-(\sigma\otimes\ldots\otimes\sigma) \qquad (3)$$

If the measurement succeeds, then $|x\rangle$ is assigned to the ensemble $\rho$. If the measurement fails, then $|x\rangle$ is assigned to $\sigma$. Asymptotically, as the number of copies becomes large, $|x\rangle$ is assigned either to $\rho$ or to $\sigma$ with probability 1. In other words, the probability of making a false assignment (denoted as $p_H$) converges to zero. The rate of convergence of the probability of successful assignment to 1 is given by the quantum Chernoff bound.

In some instances, performing the optimal discriminating measurement is a computationally difficult task for a quantum computer because it involves coherent, entangling operations on many qubit states. In some embodiments, repeated applications of a single-copy Helstrom measurement can be used as an alternative approach to provide a close approximation to the optimal measurement. These Helstrom measurements correspond to projections of $\Pi_+$ and $\Pi_-$ (i.e., protection operators) onto the positive and negative eigenspaces of $\rho-\sigma$. The resulting Helstrom classifier assigns a label to a new input to the class of cluster $\rho$ if:

$$\langle x|\Pi_+|x\rangle-\langle x|\Pi_-|x\rangle>0 \qquad (4)$$

Otherwise (i.e., $\langle x|\Pi_+|x\rangle-\langle x|\Pi_-|x\rangle\leq 0$), the Helstrom classifier assigns a label to a new input to the class of cluster $\sigma$.

The single-copy Helstrom measurement can be performed using the technique of density matrix exponentiation together with quantum phase estimation. The runtime can be on the order of $O(R\log N)$, where R is the rank of the matrix $\rho-\sigma$ and N is the dimension of the Hilbert space. Since the ensembles are constructed from |A| and |B| quantum states, respectively, $\rho-\sigma$ can only have support on |A|+|B| dimensions in the Hilbert space, and therefore rank $(\rho-\sigma)\leq|A|+|B|$. Accordingly, the classification scales linearly with the number of samples that are used to construct the classification. Furthermore, since $1/tr\rho^2\geq R$, purifying $tr\rho^2$ and/or $tr\sigma^2$ can minimize the rank of the ensembles, so the training helps to decrease the rank of $\rho-\sigma$. The routine also involves $n\in\mathcal{O}(\epsilon^{-3})$ calls to the embedding routine to estimate the expectation to error $\epsilon$.

If $\langle x|\Pi_+|x\rangle-\langle x|\Pi_-|x\rangle$ is estimated with a single measurement only, the minimum error probability (also referred to as the Helstrom bound) $p_H=\tfrac{1}{2}-\tfrac{1}{2}tr(|\rho-\sigma|)$ is bounded from above by:

$$p_H\leq\tfrac{1}{2}tr\rho\sigma+\tfrac{1}{2}\sqrt{1-tr\rho^2}\sqrt{1-tr\sigma^2} \qquad (5)$$

Accordingly, minimizing the cost of the embedding can also minimize the probability of erroneous assignment, i.e., a successfully trained embedding leads to a powerful Helstrom measurement (i.e., Helstrom measurement with maximal discrimination). Reversely, a powerful Helstrom measurement can be used as an indicator of successful embedding.

Figure 5A:
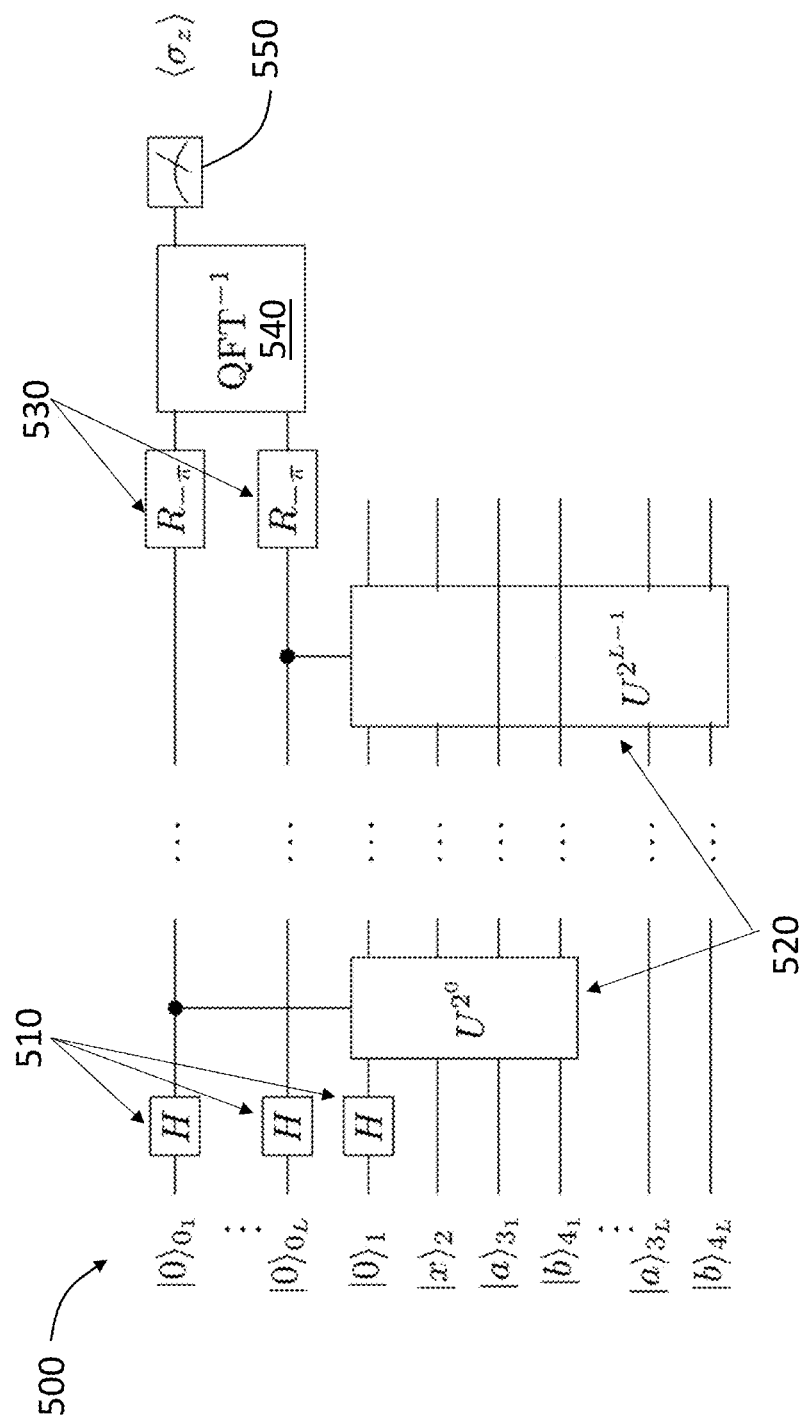
FIG. 5A shows a schematic of an apparatus for classification based on Helstrom measurement, according to an embodiment.

FIG. 5A shows a schematic of an apparatus 500 for classification based on Helstrom measurement, according to an embodiment. In some embodiments, the apparatus 500 can be used as the second QNN 120 in the apparatus 100 of FIG. 1 when training the first QNN 110 for optimal embedding. The apparatus 500 is configured to receive a dataset having two classes, i.e., class A and class B. The first L qubits (i.e., labeled as $0_l$-$0_L$ are ancillary phase qubits). The input $|x\rangle$ is a new data point to be classified. The input $|a\rangle\rightarrow a\in A$ is a data point from class A and the input $|b\rangle\rightarrow b\in B$ is a data point from class B. Each ancillary data point is sent to a corresponding Hadamard gate 510. In addition, the apparatus 500 includes L controlled unitary operators 520 (labelled as $U^p$), which are applied with respect to each phase qubit where p is the power ranging from $2^0$-$2^{L-1}$.

Figure 5B:
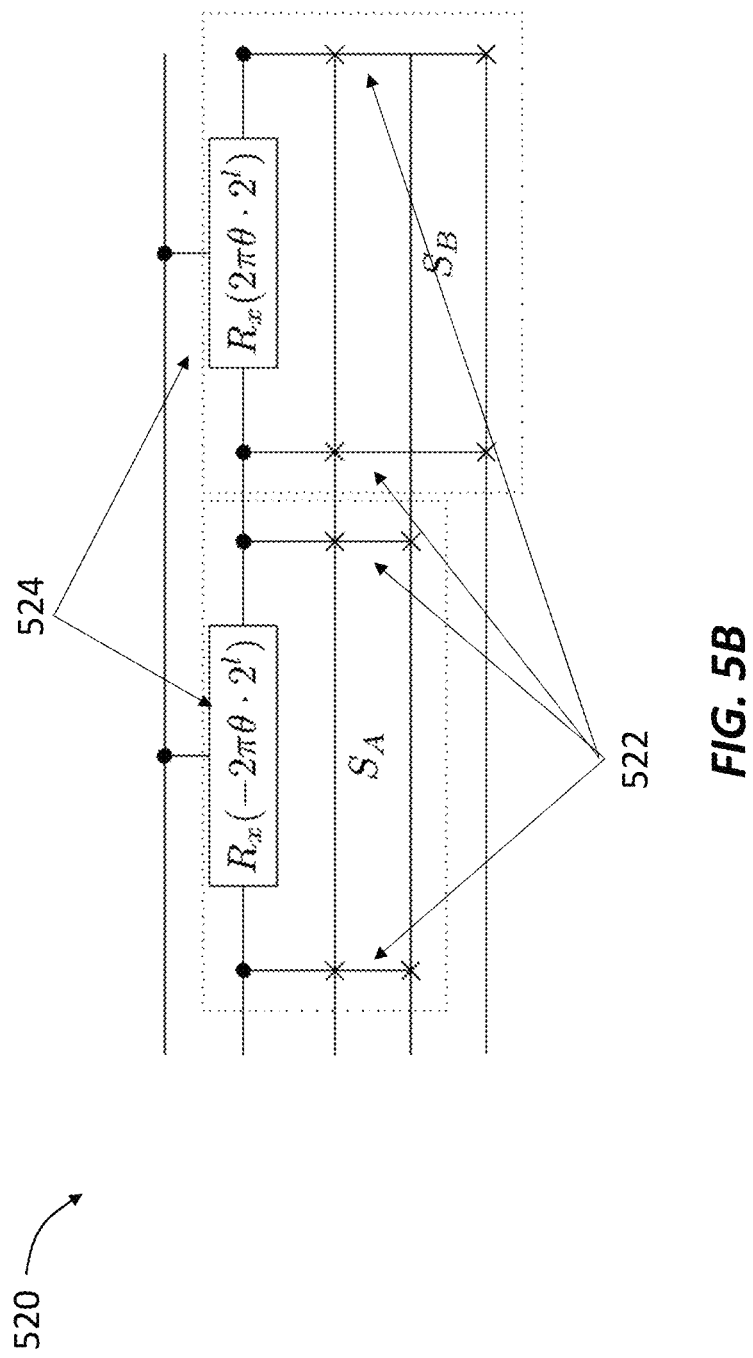
FIG. 5B shows a schematic of a controlled unitary operator that can be used in the apparatus shown in FIG. 5A, according to an embodiment.

FIG. 5B shows a schematic of a controlled unitary operator 520 that can be used in the apparatus 500. The operator 520 includes a plurality of controlled SWAP gates 522 (also referred to as Fredkin gates 522) and two rotation gates 524. The rotation angles implemented by the two rotation gates 524 are $\pm 2\pi\theta \times 2^l$, where $2^l$ is the superscript of the operator 520 (i.e., the (l+1)th operator in the apparatus 500).

Returning to FIG. 5A, the apparatus also includes two rotation gates 530 coupled to the first two input ports and an inverse quantum Fourier transform ($QFT^{-1}$) unit 540. A detector 550 is operatively coupled to the $QFT^{-1}$ unit 540 to perform measurement. In the apparatus 500, the θ in the rotation gates (see, e.g., FIG. 5B) can be a small number that controls the precision of matrix exponentiation. $S_A$ and $S_B$ in the operator 520 indicate sub-circuits acting on states belonging to class A and class B, respectively.

In some embodiments, the optimal measurement can be approximated by assigning a state to the cluster of states with which the assignment has the maximum fidelity. More specifically, the maximum fidelity approach to state discrimination assigns |x⟩ to ρ if and only:

$$\langle x|\rho|x\rangle - \langle x|\sigma|x\rangle > 0 \tag{6}$$

Otherwise (i.e., $\langle x|\rho|x\rangle - \langle x|\sigma|x\rangle \leq 0$), the maximum fidelity approach to state discrimination assigns |x⟩ to σ. Equation (6) also indicates that lowering the cost function of the embedding can decrease the mean squared error for a classifier constructed with a fidelity measurement.

Using maximum fidelity as a criterion for state assignment has the advantage that it can be implemented on a small quantum computer, i.e., evaluating the expectation values in Equation (2) can be performed using a SWAP test. The SWAP test uses multiple copies of states $|x_1\rangle$, $|x_2\rangle$ to evaluate the overlap $|(x_1|x_2)|^2$. Sampling states from the ensembles ρ and σ and comparing with copies of |x⟩ via repeated SWAP tests then allows the estimation of $\langle x|\rho|x\rangle$ and $\langle x|\sigma|x\rangle$ to the accuracy of ∈ in $O(1/\in^2)$ trials. A single run of the SWAP test to compare two embedded states in an $N=2^n$ dimensional Hilbert space involves 2n+1 qubits and O(n) quantum logic operations. The quantum logic operations are controlled SWAPs, in which two states are swapped if and only if an ancillary qubit is in the state |1⟩. For example, 101 qubits and 50 quantum logic operations can be sufficient to perform a SWAP test on two data points embedded in a Hilbert space having a dimension of about $2^{50}$ or about $10^{15}$.

Figure 6:
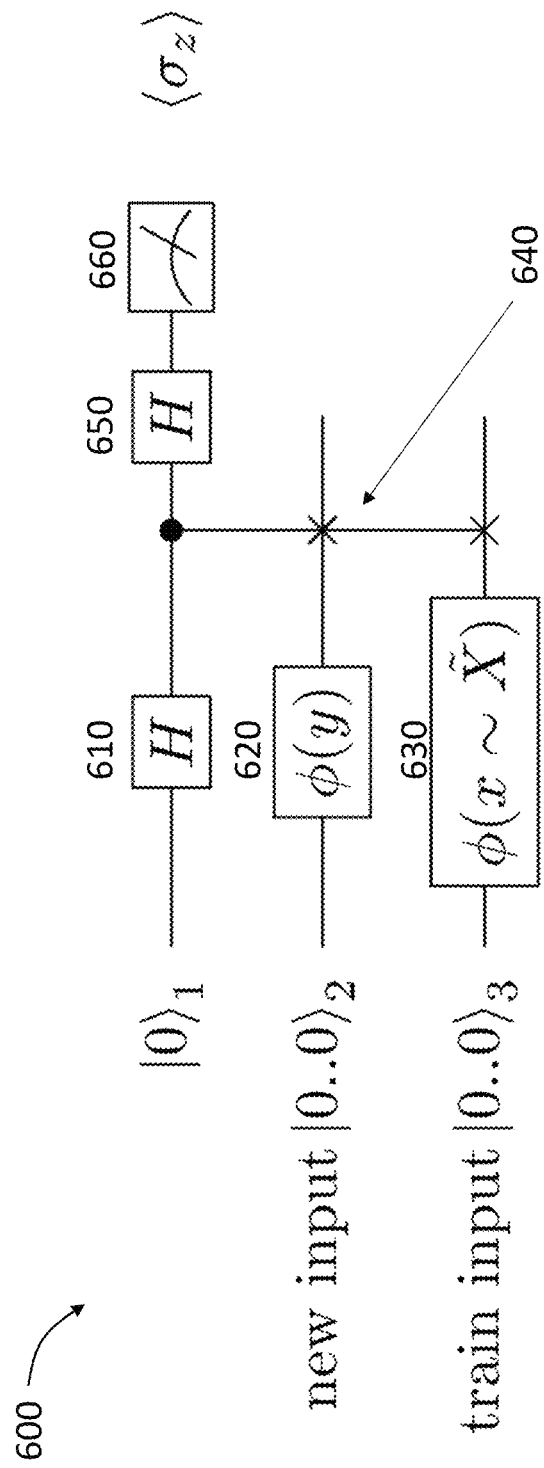
FIG. 6 shows a schematic of an apparatus for classification based on fidelity of embedding, according to an embodiment.

FIG. 6 shows a schematic of an apparatus 600 for classification based on fidelity of embedding, according to an embodiment. The apparatus 600 includes a Hadamard gate 610 configured to receive an input $|0\rangle_1$. In addition, a controlled swap gate 640 is configured to receive, as inputs, the output of the Hadamard gate 610, a new input 620, and a training input 630. The output of the controlled swap gate 640 is received by a Hadamard gate 650 followed by a detector 660 for measurement. The measurement corresponds to obtaining the expectation of the Pauli-Z operator $\sigma_Z$. The new input |φ(y)⟩ is classified using the trained dataset.

The amount of classical information that can be embedded in a quantum state (e.g., using the apparatus 300 to 600 shown in FIGS. 3-6) depends on several parameters of the quantum systems that constitute the quantum computer. The elements of a quantum computer are quantum degrees of freedom that are coupled to each other by interactions. In some instances, these degrees of freedom can be discrete, such as qubits (e.g., spins) or qudits (e.g., multilevel atoms). In some instances, the degrees of freedom can be continuous, such as qumodes (e.g., vibrational modes or modes of an optical or microwave cavity). The quantum degrees of freedom can be controlled by applying external semi-classical fields (e.g., time-varying microwave or optical coherent states). Some of the degrees of freedom are accessible to measurement. In some models of quantum computing (e.g., linear optics or cluster state quantum computing), the results of measurement can be fed back to determine future controls or measurement settings.

In some instances, the information is loaded into a quantum computer by applying a sequence of time-varying electromagnetic pulses to control the internal quantum degrees of freedom, such as in superconducting systems, ion traps, quantum dots, and atom-optical systems. In these instances, the first parameter that affects the amount of classical information embedded in the quantum state is the minimum time scale over which a classical pulse can be applied to induce a non-infinitesimal change in a quantum degree of freedom. The corresponding frequency (i.e., inverse of the time scale) is typically on the order of the energy scale of the individual degrees of freedom, divided by Planck's constant. This frequency is also referred to as the bandwidth of the system.

In addition to this first parameter, the amount of classical information can also be affected by the number of channels available to address the quantum computer and the overall coherence time of the system. For example, a sequence of time varying control signals γ(w, y) can be used in a quantum computer, and the control signals depend on the weights w and the data y. The functional dependence of this sequence on w and y is free to choose and can be configured to enhance the learning rate of the quantum embedding described herein. The overall amount of classical information that can be loaded into the quantum computer within a coherence time can be the number of channels times the bandwidth times the coherence time.

The time scale for interactions between quantum degrees of freedom can also affect the embedding. This factor, however, is not a limitation for the embedding as long as the time over which the information is loaded allows sufficient time for quantum information to be spread throughout the system. In the case of an all-to-all connected architecture, this time scales as the logarithm of the number of quantum degrees of freedom. For a locally connected one-dimensional system, the amount of time for all degrees of freedom to communicate with each other scales as the interaction time multiplied by the number of subsystems. For a locally interacting two-dimensional system, the time scales as the square root of the number of subsystems.

The number of qubits available can be another factor affecting the information embedding. A quantum embedding that can faithfully represent the unknown underlying metric over m data points involves $O(\log_2 m)$ qubits. This is also not a limiting factor for quantum computers with $O(10^2)$ qubits. For example, in an ion trap with 100 ions, each of which is individually addressable, with a bandwidth of 100 MHz, the coherence time is on the order of $10^1$ seconds. Over the coherence time of the ion trap system, the classical control signals γ(w, y) can convey on the order of $10^{11}$ classical bits. The interaction time between ions as mediated by the vibrational degrees of freedom of the ion trap is 10-100 microseconds, allowing quantum information to be spread throughout the system over the course of the coherence time. Atoms in optical lattices exhibit similar figures to ion traps.

By comparison, some superconducting quantum computers have a bandwidth of about 10 GHz and a coherence time of around 100 microseconds. Taking a 100 qubit superconducting device with 100 input channels allows the classical signals γ(w, y) to embed on the order of $10^{10}$ classical bits over a coherence time. The interaction time of 10-100 nanoseconds can be sufficient to allow the qubits to interact globally during the coherence time. Electron spins in silicon quantum dots exhibit similar figures to superconducting qubits.

A different analysis is used for measurement-based optical quantum computers based on cluster state quantum computing (either in the qubit or continuous variable context). In these instances, the amount of classical information that can be injected into the system via introducing coherent states and by modulating the feedback is proportional to the overall size of the cluster state that can be created (i.e., the number of modes or qubits in the cluster state).

For the quantum embedding technique using pre-training as described herein, the number of classical bits that are loaded into the system is twice the number of bits in an individual datum (e.g., twice the number of bits in the images of a dog or a cat to be classified). Once two images have been embedded as quantum states, a SWAP test is used to compare them. Then two more images are embedded and compared, etc. Quantum coherence needs to persist only for each individual embedding and SWAP test. The analysis above shows that near term quantum computers can be adequate for embedding and comparing such classical images.

Figure 7A:
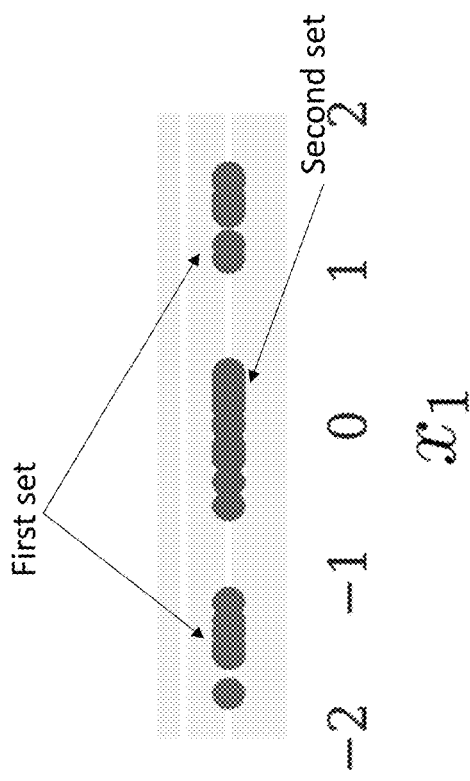
FIGS. 7A-7I illustrate quantum embedding for a one-dimensional dataset that is non-overlapping but not linearly separable, according to an embodiment.
Figure 7B:
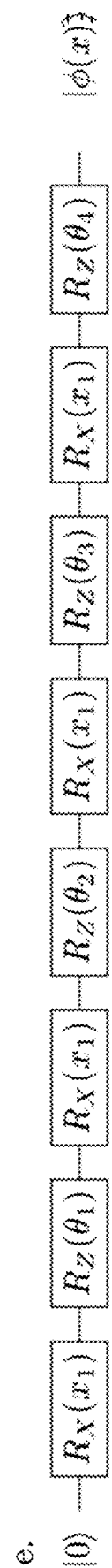
Figure 7E:
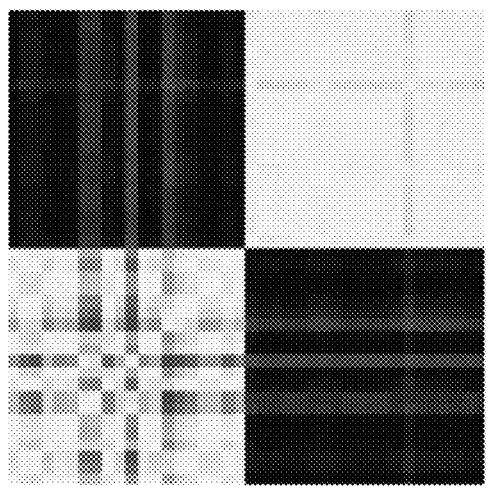
Figure 7D:
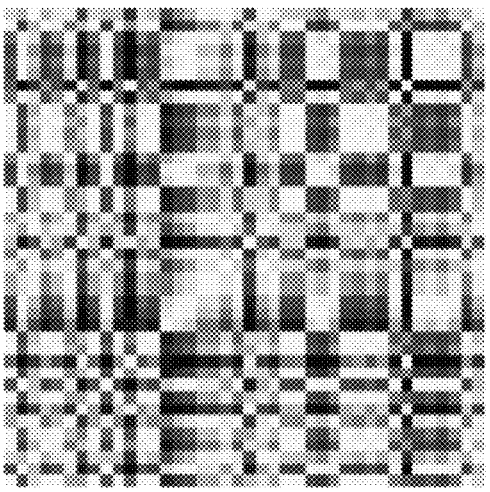
Figure 7C:
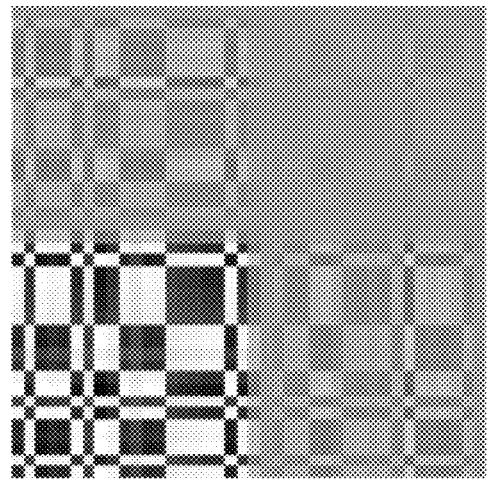
Figure 7G:
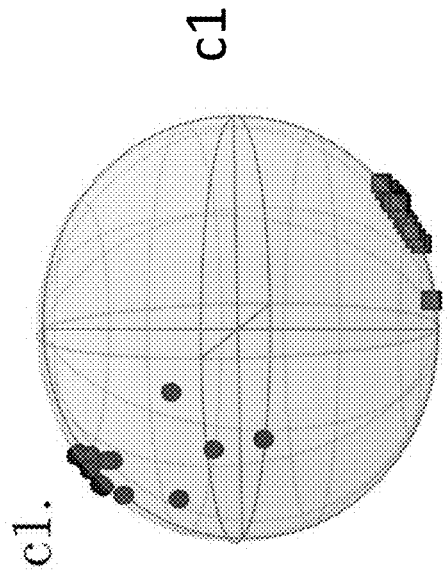
Figure 7F:
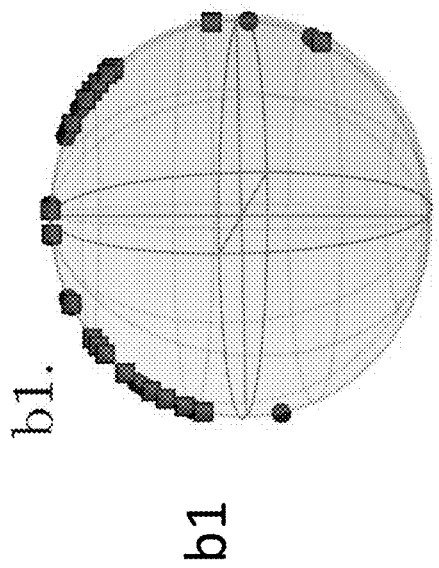
Figures 7H, 7I:
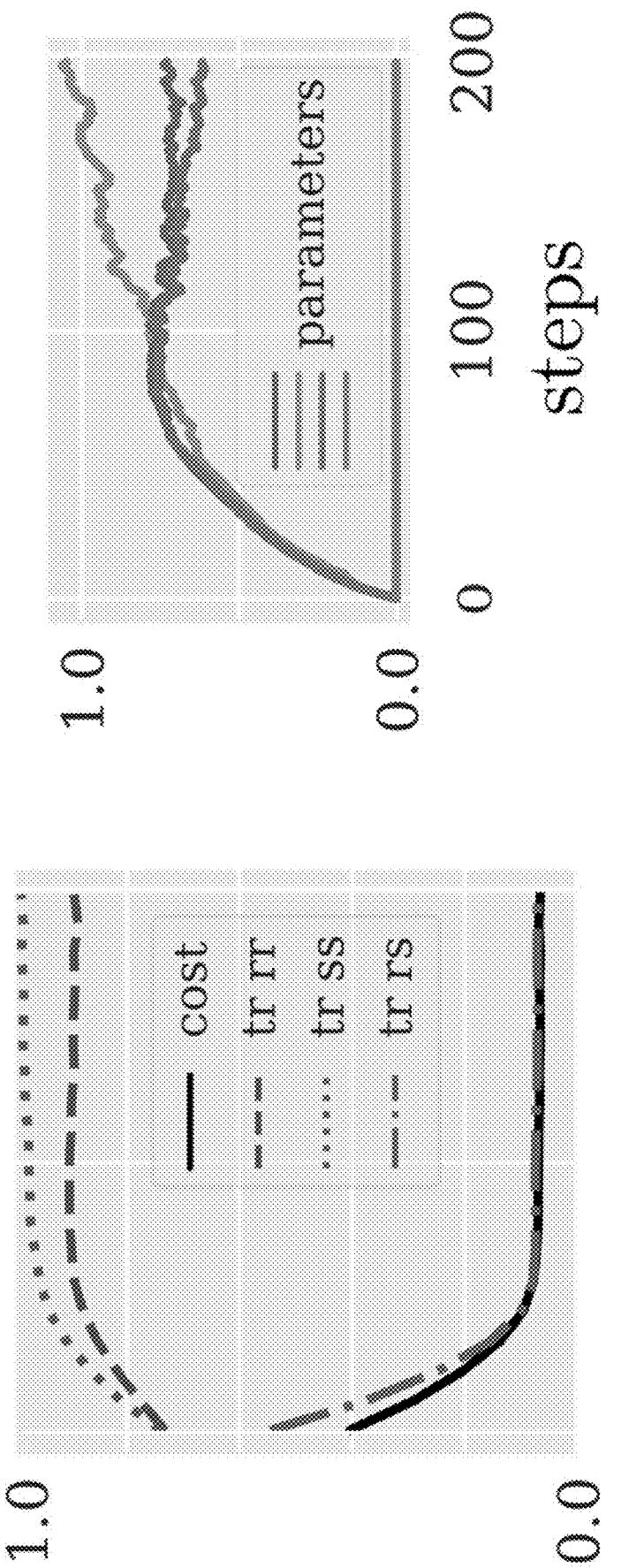

FIGS. 7A-7I illustrate quantum embedding for a one-dimensional dataset that is non-overlapping but not linearly separable, according to an embodiment. As seen in FIG. 7A, the dataset includes two sets of data: the second set of data points are sandwiched between data points of the first set. As such, the data points from the two sets of data are not linearly separable, i.e., they cannot be separated by a linear line. FIG. 7B shows a schematic of a circuit that is used to embed the classical dataset in FIG. 7A into quantum states. The feature map includes a series of rotation gates and the rotation angles $\theta_1$ to $\theta_4$ are adjustable to allow optimization. FIG. 7C shows the pairwise product of any two data points in the dataset illustrated in FIG. 7A. FIGS. 7D and 7E show the mutual overlaps of the dataset after 0 and 200 steps of training, respectively. FIGS. 7F and 7G visualize the dataset on the Bloch sphere after 0 and 200 steps of training, respectively. FIGS. H and I show the cost function and circuit parameters, respectively, throughout training. The embedding learns to use the spherical geometry of the Bloch sphere to separate the two types of data points. The training used a batch size of 5. As used herein, the batch size refers to the number of data samples (from a training data set) that are used by one iteration of an optimization process. In FIGS. 7A-7I, a new batch of 5 training samples is determined and used to update the parameters.

The training illustrated in FIGS. 7A-7I is performed using an embedding circuit based on Quantum Algorithm Optimization Approach (QAOA). The circuit (shown in FIG. 7B) includes one- and two-qubit quantum logic operations, such as single qubit rotations $e^{i\varphi\sigma}$ and two qubit ZZ interactions $e^{i\theta\sigma_x \otimes \sigma_z}$, where the axes of rotation j and the angles of rotation $\varphi$ and $\theta$ are parameters that can be optimized. In FIG. 7B, the circuit includes alternating layers of individually programmable single qubit X rotations, and a programmable Ising model layer including fully connected, individually programmable pairwise ZZ interactions (which commute with each other) together with single qubit Z rotations. Nearest-neighbor coupled pairwise ZZ interactions in one or more dimensions also suffice for universality. The input to the circuit is taken to be the state $|00 \ldots 0\rangle$.

To perform the embedding, $R_x$ parameters are designated to encode the input features $x=(x_1, \ldots, x_N)^T$, and the remainder are used to encode the trainable parameters $\theta$. The overall unitary transformation $U(\theta, x)$ is then a function of the weights and the input, and the embedding takes the form $x \to |x\rangle_\theta = U(\theta, x)|00 \ldots 0\rangle$. The overlap between two embedded states is then: $_\theta\langle x_1 | x_2 \rangle_\theta = \langle 00 \ldots 0 | U^\dagger(\theta, x_1) U(\theta, x_2) | 00 \ldots 0 \rangle$.

Due to the universality of the circuit class in the limit of many layers, evaluating this overlap for different values of $\theta$, $x_1$, and $x_2$ is equivalent to evaluating the outcome of an arbitrary quantum computation over n qubits, which is usually inaccessible to a classical computer. A three-layer circuit, which includes X rotations, followed by an Ising layer, followed by second layer of X rotations, can implement instantaneous quantum polynomial time computation (IQP).

Figures 8A, 8B:
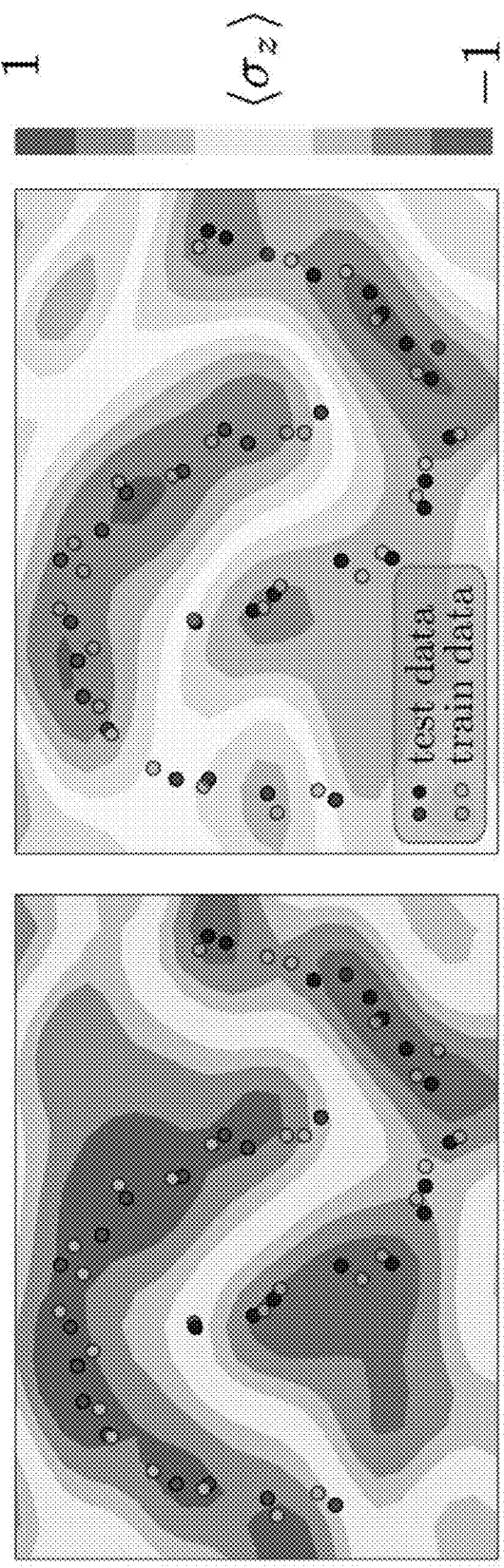
FIGS. 8A and 8B show classification of the dataset illustrated in FIG. 7A based on Helstrom measurement and fidelity measurement, respectively.

FIGS. 8A and 8B show classification of the dataset illustrated in FIG. 7A based on Helstrom measurement and fidelity measurement, respectively. The x-axis and the y-axis are the first feature of the data and the second feature of the data, respectively. In other words, the plot shows 2-d data $[x_1, x_2]$ plotted with the decision regions of classifiers. The dataset is embedded by a 2 qubit and 5 layer QAOA feature map trained for 200 steps of batch size 5. FIGS. 8A and 8B plot the Pauli-Z expectation of a (perfect) fidelity or Helstrom measurement, implemented via error-free simulations. While both measurements recover the shape of the decision boundary, the expectation of the Helstrom measurement is visibly further apart from zero than the fidelity expectation.

While various embodiments have been described and illustrated herein, a variety of other means and/or structures for performing the function and/or obtaining the results and/or one or more of the advantages described herein, and each of such variations and/or modifications are possible. More generally, all parameters, dimensions, materials, and configurations described herein are meant to be examples and that the actual parameters, dimensions, materials, and/or configurations will depend upon the specific application or applications for which the disclosure is used. It is to be understood that the foregoing embodiments are presented by way of example only and that other embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:
   training a first quantum neural network (QNN) at a first time and without being coupled to a second QNN, to perform quantum embedding by embedding a first dataset including classical data into a plurality of quantum states for which two or more clusters are defined in Hilbert space, and to reduce an overlap between at least two of the two or more clusters, thereby generating a first trained QNN in a fixed setting, a first output of the first trained QNN including the plurality of quantum states;
   generating, using at least a portion of the first trained QNN, a second output based on a second dataset and using the fixed setting; and
   sending the second output to the second QNN at a second time after the first time, and when the second QNN is operatively coupled to the first trained QNN, to train the second QNN.

2. The method of claim 1, further comprising:
   measuring, via a quantum circuit and before the training, an output of the first QNN, to generate a first measurement; and
   determining the fixed setting based on the first measurement.

3. The method of claim 1, further comprising:
   measuring, via a quantum circuit and before the training, a fidelity of an output of the first QNN; and
   determining the fixed setting based on the fidelity.

4. The method of claim 1, further comprising:
   performing, via a quantum circuit and before the training, a Helstrom measurement of an output of the first QNN; and
   determining the fixed setting based on the Helstrom measurement.

5. The method of claim 1, further comprising configuring one or more trainable parameters of one or more quantum gates within the first QNN, the one or more quantum gates configured to function as a quantum feature map on the classical data.

6. A non-transitory, processor-readable medium storing code representing instructions to be executed by a processor, the code comprising code to cause the processor to:
   generate, using at least a portion of a first quantum neural network (QNN), a first output based on a first dataset and using a fixed setting, the first output including a plurality of quantum states, the fixed setting being determined based on training the first QNN using a second dataset at a first time and without being coupled to a second QNN, to quantum embed classical data in the second dataset into the plurality of quantum states for which two or more clusters are defined in Hilbert space via quantum embedding, and to reduce an overlap between at least two of the two or more clusters; and
   send the first output to the second QNN, at a second time after the first time, and when the second QNN is operatively coupled to the first QNN, to train the second QNN.

7. The non-transitory, processor-readable medium of claim 6, wherein the fixed setting is a first fixed setting and the code further comprises code to cause the processor to configure the first QNN in a second fixed setting during training of the second QNN.

8. The non-transitory, processor-readable medium of claim 6, wherein the fixed setting is determined based on measurement of a second output generated by the first QNN using the second dataset, the measurement of the second output being performed by a quantum circuit.

9. The non-transitory, processor-readable medium of claim 6, wherein the first fixed setting is determined based on a fidelity of a second output generated by the first QNN using the second dataset, the fidelity of the second output being measured by a quantum circuit.

10. The non-transitory, processor-readable medium of claim 6, wherein the first fixed setting is determined based on a Helstrom measurement of a second output generated by the first QNN using the second dataset, the Helstrom measurement of the second output being performed by a quantum circuit.

11. The non-transitory, processor-readable medium of claim 6, wherein the code further includes code to cause the processor to configure one or more trainable parameters of one or more quantum gates within the first QNN, the quantum gates functioning as a quantum feature map on the classical data.

12. An apparatus, comprising:
a first quantum neural network (QNN) and a second QNN,
the first QNN configured in a fixed setting, the first QNN configured to receive a first dataset and generate a first output using the fixed setting, the fixed setting being determined by training the first QNN, at a first time and without being coupled to the second QNN, using a second dataset, to quantum embed classical data in the second dataset into a plurality of quantum states for which two or more clusters are defined in Hilbert space, and to minimize an overlap between at least two of the one or more clusters; and
the second QNN configured to receive the first output and generate a second output at a second time after the first time, and when the second QNN is operatively coupled to the first trained QNN.

13. The apparatus of claim 12, further comprising a quantum circuit configured to perform a Helstrom measurement of the first output.

14. The apparatus of claim 12, further comprising a quantum circuit configured to measure a fidelity of the first output.

15. The apparatus of claim 12, wherein the first QNN includes one or more quantum gates configured to function as a quantum feature map on the classical data, the quantum gates comprising one or more trainable parameters.

16. The apparatus of claim 12, wherein the fixed setting is hard-wired in the first QNN.

17. The apparatus of claim 12, wherein the fixed setting is modifiable by a user.

* * * * *